US006978375B1

(12) United States Patent
Nusser et al.

(10) Patent No.: US 6,978,375 B1
(45) Date of Patent: Dec. 20, 2005

(54) SYSTEM AND METHOD FOR SECURE AUTHENTICATION OF EXTERNAL SOFTWARE MODULES PROVIDED BY THIRD PARTIES

(75) Inventors: Stefan Nusser, Boca Raton, FL (US); Jeffrey B. Lotspiech, San Jose, CA (US); Paul R. Rettig, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 09/658,253

(22) Filed: Sep. 8, 2000

(51) Int. Cl.[7] .................................. G06F 11/30
(52) U.S. Cl. ...................... 713/187; 713/194
(58) Field of Search ........................ 713/187, 168, 713/194, 172, 167, 165, 188; 380/201; 705/66, 51, 57

(56) References Cited

U.S. PATENT DOCUMENTS

| 4,200,770 A | 4/1980 | Hellman et al. |
| 4,218,582 A | 8/1980 | Hellman et al. |
| 4,272,810 A | 6/1981 | Gates et al. |
| 4,405,829 A | 9/1983 | Rivest et al. |
| 4,424,414 A | 1/1984 | Hellman et al. |
| 4,463,387 A | 7/1984 | Hashimoto et al. |
| 4,528,643 A | 7/1985 | Freeny, Jr. |

(Continued)

FOREIGN PATENT DOCUMENTS

| EP | 0704785 A2 | 4/1996 |
| WO | WO 96/41445 | 12/1996 |
| WO | WO 97/43717 | 11/1997 |
| WO | WO 98/13970 | 4/1998 |
| WO | WO 98/39878 | 9/1998 |

OTHER PUBLICATIONS

J. Linn, "Privacy Enhancement for Internet Electron Mail: Part I: Message Encryption and Authentication Procedures," RFC 1421, Feb. 1993, pp. 1–37.
S. Kent, "Privacy Enhancement for Internet Electronic Mail: Part II: Certificate–Based Key Management," RFC 1422, Feb. 1993, pp. 1–28.
D. Balenson, "Privacy Enhancement for Internet Electronic Mail: Part III: Algorithms, Modes, and Identifiers," RFC 1423, Feb. 1993, pp. 1–13.

(Continued)

*Primary Examiner*—Gregory Morse
*Assistant Examiner*—Andrew L Nalven
(74) *Attorney, Agent, or Firm*—David M. Shofi; Jose Gutman; Fleit, Kain, Gibbons, Gutman, Dongini & Bianco PL

(57) ABSTRACT

An external module loads into an entity's memory and is transformed by two functions. These are namely, the STOMP function and the UNSTOMP function. One or both of these functions is based on the actual code that is found in a legitimate version of the external module. The STOMP-UNSTOMP pair produces an external module that works differently if even a single byte of code in the external module has been changed by an attacker. The STOMP transforms the external module and makes it temporarily unusable whilst conversely, the UNSTOMP repairs the damage and makes it workable again. Thus, if the module is not authentic, the pairing between the STOMP and UNSTOMP is broken. Therefore, a patched module from a hacker remains unusable since the STOMP and UNSTOMP transformations do not produce a working external module. Because of the STOMP and UNSTOMP technique, an application is secure because if an external module is free from tampering then the application executes normally. In the event that an illicitly patched external module is loaded then the application fails. In either case, no audio, video or information content is illegally copied because of the disablement of the external module by the STOMP-UNSTOMP procedure.

20 Claims, 4 Drawing Sheets

U.S. PATENT DOCUMENTS

| | | | |
|---|---|---|---|
| 4,731,840 | A | 3/1988 | Mniszewski et al. |
| 4,757,534 | A | 7/1988 | Matyas et al. |
| 4,782,529 | A | 11/1988 | Shima |
| 4,803,725 | A | 2/1989 | Horne et al. |
| 4,809,327 | A | 2/1989 | Shima |
| 4,825,306 | A | 4/1989 | Robers |
| 4,868,687 | A | 9/1989 | Penn et al. |
| 4,868,877 | A | 9/1989 | Fischer |
| 4,878,246 | A | 10/1989 | Pastor et al. |
| 4,879,747 | A | 11/1989 | Leighton et al. |
| 4,905,163 | A | 2/1990 | Garber et al. |
| 4,926,479 | A | 5/1990 | Goldwasser et al. |
| 4,944,006 | A | 7/1990 | Citta et al. |
| 4,972,472 | A * | 11/1990 | Brown et al. ............... 380/277 |
| 4,995,082 | A | 2/1991 | Schnorr |
| 5,005,200 | A | 4/1991 | Fischer |
| 5,130,792 | A | 7/1992 | Tindell et al. |
| 5,159,634 | A | 10/1992 | Reeds, III |
| 5,214,702 | A | 5/1993 | Fischer |
| 5,220,604 | A | 6/1993 | Gasser et al. |
| 5,224,163 | A | 6/1993 | Gasser et al. |
| 5,224,166 | A | 6/1993 | Hartman, Jr. |
| 5,260,788 | A | 11/1993 | Takano et al. |
| 5,261,002 | A | 11/1993 | Perlman et al. |
| 5,276,901 | A | 1/1994 | Howell et al. |
| 5,315,658 | A | 5/1994 | Micali |
| 5,319,705 | A | 6/1994 | Halter et al. |
| 5,343,527 | A * | 8/1994 | Moore ....................... 713/179 |
| 5,347,580 | A | 9/1994 | Molva et al. |
| 5,355,302 | A | 10/1994 | Martin et al. |
| 5,369,705 | A | 11/1994 | Bird et al. |
| 5,371,794 | A | 12/1994 | Diffie et al. |
| 5,412,717 | A | 5/1995 | Fischer |
| 5,420,927 | A | 5/1995 | Micali |
| 5,497,421 | A | 3/1996 | Kaufman et al. |
| 5,509,071 | A | 4/1996 | Petrie, Jr. et al. |
| 5,519,778 | A | 5/1996 | Leighton et al. |
| 5,537,475 | A | 7/1996 | Micali |
| 5,557,541 | A | 9/1996 | Schulhof et al. |
| 5,581,479 | A | 12/1996 | McLaughlin et al. |
| 5,588,060 | A | 12/1996 | Aziz |
| 5,592,664 | A | 1/1997 | Starkey |
| 5,604,804 | A | 2/1997 | Micali |
| 5,606,617 | A | 2/1997 | Brands |
| 5,636,139 | A | 6/1997 | McLaughlin et al. |
| 5,666,420 | A | 9/1997 | Micali |
| 5,673,316 | A | 9/1997 | Auerbach et al. |
| 5,675,734 | A | 10/1997 | Hair |
| 5,710,887 | A | 1/1998 | Chelliah et al. |
| 5,796,841 | A | 8/1998 | Cordery et al. |
| 5,892,900 | A | 4/1999 | Ginter et al. |
| 5,974,549 | A * | 10/1999 | Golan ....................... 713/200 |
| 5,978,482 | A * | 11/1999 | Dwork et al. .................. 705/51 |
| 6,480,959 | B1 * | 11/2002 | Granger et al. ............. 713/189 |
| 6,698,016 | B1 * | 2/2004 | Ghizzoni .................... 717/162 |

OTHER PUBLICATIONS

B. Kaliski, "Privacy Enhancement for Internet Electronic Mail: Part IV: Key Certification and Related Services," RFC 1424, Feb. 1993, pp. 1–8.

* cited by examiner

SYSTEM AND METHOD FOR SECURE AUTHENTICATION OF EXTERNAL SOFTWARE MODULES PROVIDED BY THIRD PARTIES

CROSS-REFERENCE TO RELATED APPLICATIONS

This patent application is related to U.S. patent application Ser. No. 09/658,218, filed on even date herewith, commonly assigned to the assignee hereof, and the entire disclosure of which is herein incorporated by reference.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

The invention relates to secure electronic delivery of content, such as music or movies. More particularly, the invention relates to an improved method and apparatus for authenticating external modules.

2. The Prior Art

An important problem in protecting content is making sure that only compliant, authorized software modules are allowed to process the content on the user's computer. For example, the content owners might want to restrict the number of perfect digital copies that the end users can make from a single piece of purchased content.

Or, they might want to allow a restricted "preview mode", where the content (like a song) is delivered for free, but only be allowed to play some limited number of times. Against this desire of the content owners, are armies of hackers who want to figure out how to patch the software modules to disable the restrictions.

Therefore, code authentication becomes a critical problem: determining whether a given software module is intact and compliant, or has been hacked. In the art, authentication is often treated as a cryptographic problem. The standard way to verify authentication is with digital signatures.

Further, even though the electronic industry is enamored with using digital signatures for code authentication problems, the use of signatures is in reality a poor substitute for a robust cryptographic solution for the following reasons. A digital signature resolves itself into a single yes/no decision, i.e., "did the signature match"? A single jump instruction is thereby generated, which, if patched, disables the signature checking. A hacker's job is facilitated by such a simplistic method. Another algorithm for authenticating data files includes the generation and use of what is known as a "signet". Signets are described in U.S. Pat. Nos. 6,038,316 and 5,978,482 assigned to International Business Machines Corporation. These patents are hereby incorporated by reference. Signets are utilized according to the following description to provide a method and system to distribute extrication functions to legitimate users of information that are (1) openly available, publicly computable, and computationally infeasible to invert; (2) use an extremely long decryption key; and (3) only short communication from the authorization center occurs. An authorization center processor receives a user identifying signal value ni, and then responsively creates a corresponding authorization signal ai, called a "signet", since it shares some properties of a digital signature. The pair (ai, ni) is called a "signet pair". The extrication function operates on the signet pair to produce a key signal K that may be used to decrypt the digital information. The extrication function is publicly computable. However, it is computationally infeasible to determine how to create a new authorization signal aj for a corresponding user processor identifying signal value nj, or even to create any new valid signet pair wherein a "valid signet pair" is any pair (x, y) in which x is the result obtained by applying the authorization function, or computation, to y. An alternative method offers the feature that, although the signet pair is short, the key produced by the extrication function is long. The combination of having a long key K with the intractability of generating a new signet pair based on previous signet pairs and the extrication function, serves to de-motivate (i.e. by use of a long K) and incapacitate (i.e. the feature of intractability) those who might wish to attempt to become illegitimate or pirate authorization centers. So, IBM's digital signet technology (which generate thousands of bytes that are correct if and only if the signet matches the hash) is far superior to that of an ordinary signature in this application.

The attack that these hackers utilize is that of patching external modules with illicit functions. The hackers then distribute these hacked programs on the Internet. Users search these out and download them, because copying restrictions have been removed that the legitimate programs enforce. For example, last November, a program called "DeCSS" appeared on the Internet. It allowed users to copy DVD videos, something that legitimate DVD video players are forbidden (by license) to do. While DeCSS was an entire application, this invention envisions that it is not necessary for the hacker to provide an entire program. For example, he may be able to replace only a single module within a program to achieve the result he desires. This problem is exacerbated in the modern world, because programs are often comprised, in part, of external modules provided by manufacturers different than the one manufacturing the program. In particular, a system optionally uses these external modules which are loaded by an application on demand. External modules are typically implemented as DLLs under WIN32 or shared object (SO) files on UNIX platforms and are provided by third party manufacturers.

An example for an interaction between an application and external modules is the EMMS, or Electronic Media Management System, end user application and its use of decoder modules. Based on the type of encoding of an album, a decoder module needs to be located and loaded. Once the module is loaded, its externalized functions are called in order to perform the decompression of the audio data.

This example also highlights the security risk of using external modules. Essentially, the application loads and executes untrusted code. In the above example, that code gets access to the encoded audio data. The existence of a published API (like ACM, an Audio Compression Manager published by Microsoft for modules that are transforming an audio stream for decoders) makes it particularly easy for an attacker to replace the external module with a different one which, for example, simply writes the compressed audio data to disk and thereby obtains an in-the-clear copy which could then be distributed on the Internet.

Any authentication technology used for authenticating external modules needs to take into account that the external module remains functional so that it can be used by other applications which do not require a high level of trust, or deploy their own authentication scheme. Consequently, the external module cannot be simply encrypted by the secure application since that would prevent any other application from using it. As shown by the example above, code in external modules should never be executed without first authenticating that module.

Therefore, what is desired is a more efficient method, apparatus and product for securing and verifying the authenticity of external software modules.

SUMMARY OF THE INVENTION

The preferred embodiment of the invention comprises an external module that has been loaded into an entity's memory being transformed by two functions. These are namely, the STOMP function and the UNSTOMP function. One or both of these functions is based, in some way, on the actual code that is found in the legitimate version of the external module. In other words, the STOMP-UNSTOMP pair produces an external module that in the preferred embodiment works differently if even a single byte of code in the external module has been changed by an attacker.

Essentially, the STOMP and the UNSTOMP are paired. The STOMP transforms the external module and makes it temporarily unusable whilst conversely, the UNSTOMP repairs the damage and makes it workable again. Thus, if the module is not authentic, the pairing between the STOMP and UNSTOMP is broken, because at least one of them behaves differently. Therefore, a patched module frorr, a hacker remains unusable since the STOMP and UNSTOMP transformations do not produce a working external module. Because of the STOMP and UNSTOMP technique, an application is secure because if an external module is free from tampering then the application executes normally. In the event that an illicitly patched external module is loaded then the application fails. In either case, no audio, video or information content is illegally copied because of the disablement of the external module by the STOMP-UNSTOMP procedure.

BRIEF DESCRIPTION OF THE FIGURES

The subject matter which is regarded as the invention is particularly pointed out and distinctly claimed in the claims at the conclusion of the specification. The foregoing and other features, and advantages of the invention will be apparent from the following detailed description taken in conjunction with the accompanying drawings.

DETAILED DESCRIPTION OF THE PREFERRED EMBODIMENTS

Figure 1:
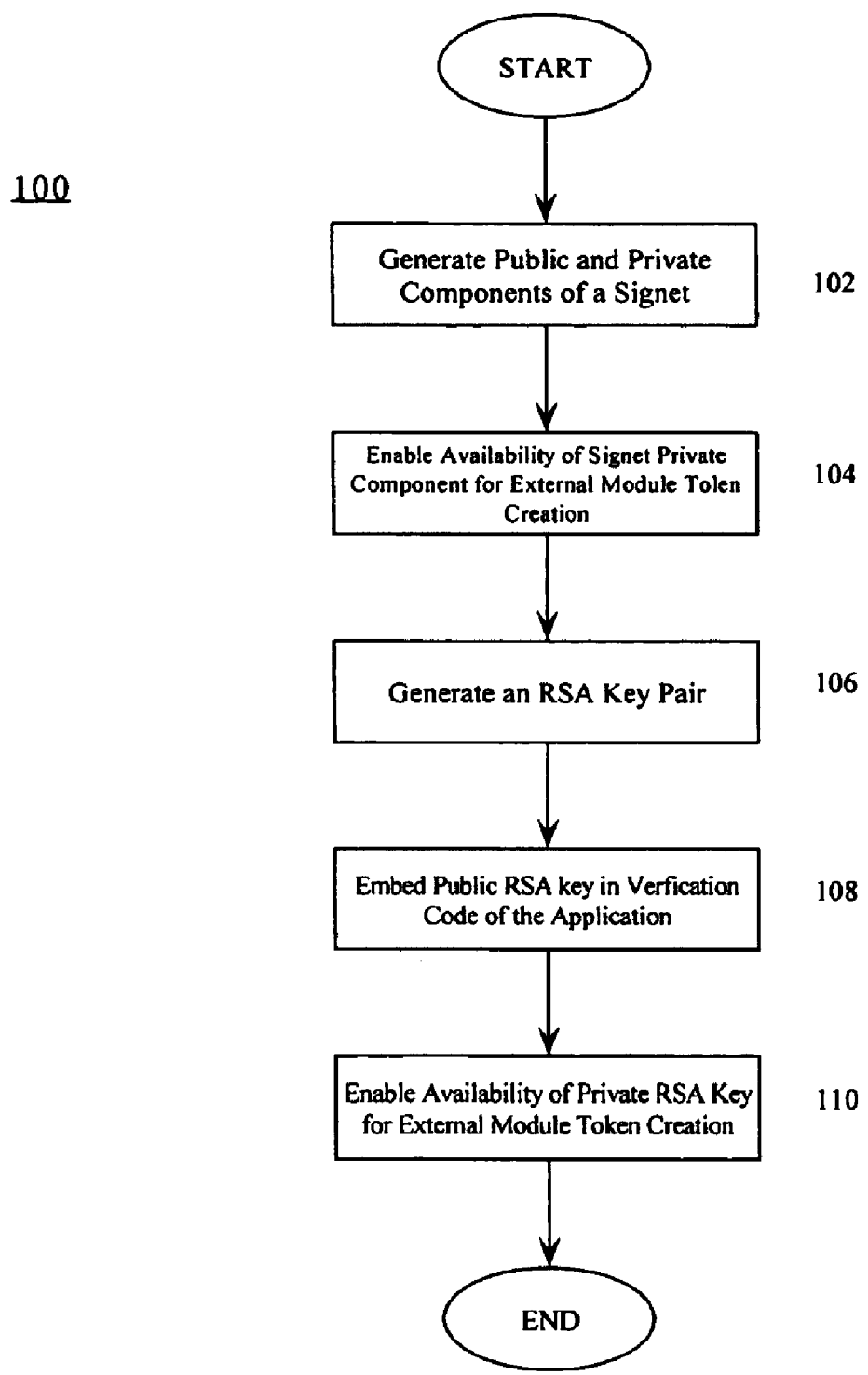
FIG. 1 is a flow diagram (100) that describes the process of generating public/private key pairs as practiced in the invention.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Embodiment

The scope of this invention comprises all methods of STOMPing and UNSTOMPing the external module. In the preferred embodiment, a function based on an RSA encryption is utilized to STOMP the external module, and a function based on digital signets is utilized to UNSTOMP the STOMPed external module. Digital signets are described in U.S. Pat. Nos. 6,038,316, and 5,978,482. The process comprises several steps including: 1) the generation of public/private key pairs, 2) the generation of an authentication token, 3) the STOMPing of an external module and 4) the UNSTOMPing of a STOMPed external module. First, a discussion of the generation of public/private key pairs.

FIG. 1 comprises a flow diagram (100) that describes the process of generating public/private key pairs as practiced in the invention. First, public and private components of a signet are generated (102). The signet's private component is made available to a code authentication authority (104) and is to be used by this authority to create authentication tokens for external modules. Then an RSA key pair is generated (106). The public RSA key is embedded in the verification code of the application (108). Finally, the private key is made available to a code authentication authority (110) and is to be used by this authority to create authentication tokens for external modules. The signet's private component and the RSA private key are either transferred to the code authentication authority in a secure fashion or, better still, generated by the code authentication authority itself. The system depends on these private components being not shared with other entities. The code authentication authority is the entity that is trusted by all the other entities to be able to determine whether an external module is indeed implementing the desired functionality. Various delegation mechanisms are within the scope of this disclosure. These key generation steps comprise an initial setup phase that needs to be performed before any authentication tokens can be issued. Next, a description of the process for generating an authentication token is described.

Figure 2:
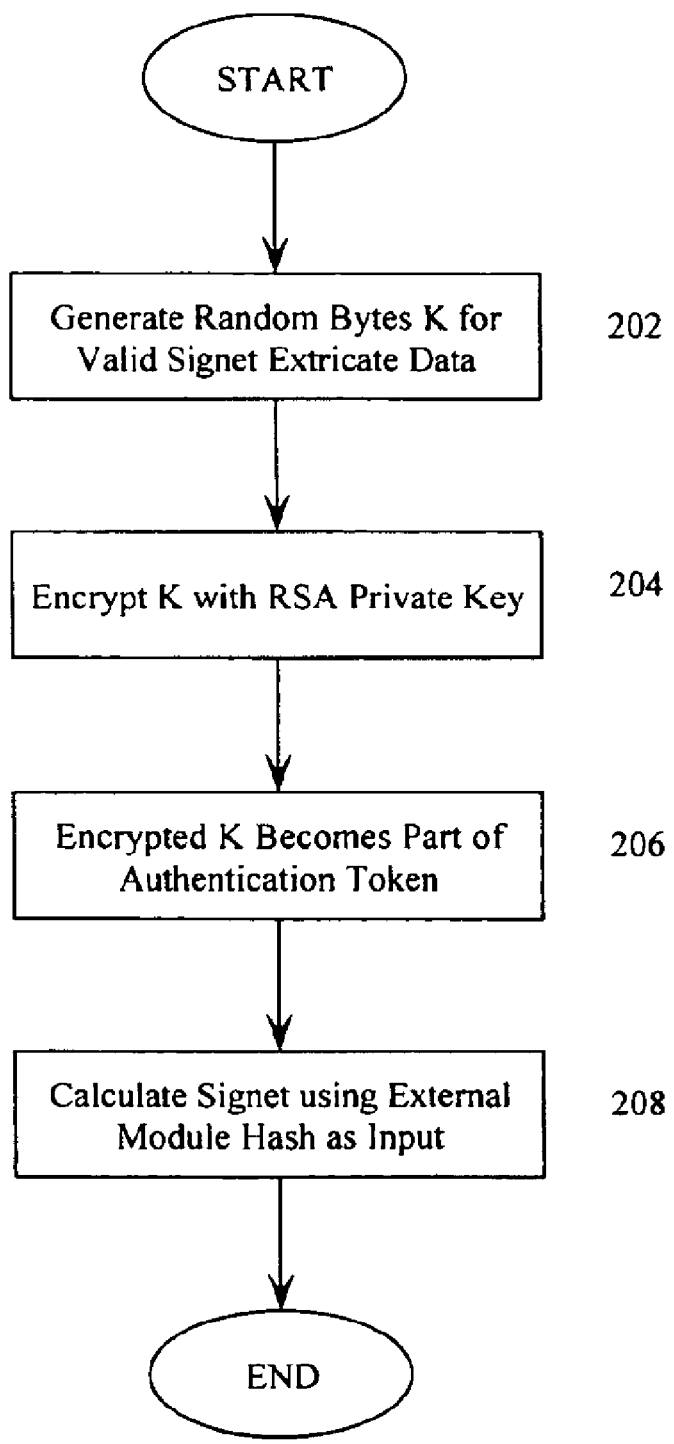
FIG. 2 is a flow diagram (200) that describes the process of generating an authentication token for an external module.

FIG. 2 comprises a flow diagram (200) that describes the process of generating an authentication token for an external module. The process of generating a token for an external module involves the following steps. First, a certain number of random bytes (K) are generated (202) so that they are valid signet extrication data. Then K is encrypted (204) with an RSA private key. The encrypted K becomes part of the authentication (206) token. Finally, the signet is calculated (208) using the hash of the external module as input so that the signet upon successful extrication creates K. As a result, both of the following statements are true. Namely, K gets recreated at run time in two different ways: 1) once by means of the RSA calculation during the STOMP and than 2) as the signet extrication data during the UNSTOMP. If the module is modified, the hash is different and the signet extrication process creates a different K. As a consequence, the UNSTOMP does not reproduce the module correctly. Using the invention presented in this disclosure, the private components, namely, the RSA private key and the private signet component are used to calculate authentication tokens for each external module. Thus, the authentication token consists of the signet on the external module, and K encrypted with the RSA private key. In addition, only public information is placed in the secure application itself. After the process of generating keys and tokens has completed the authentication process is ready for field use.

Figure 3:
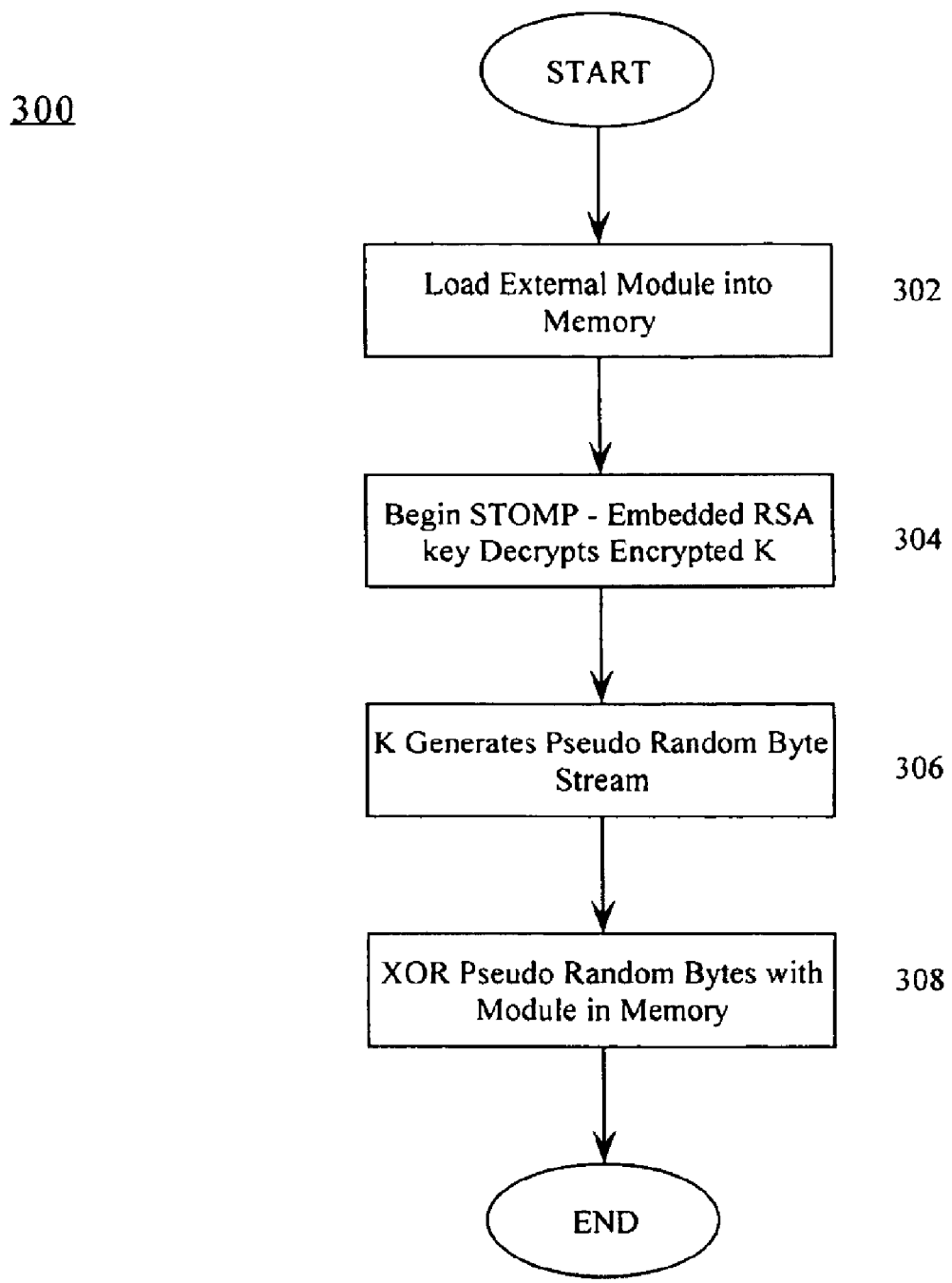
FIG. 3 is a flow diagram (300) that describes the process of STOMPing an external module for authentication purposes.

In particular, at run time, the verification code performs the steps as shown in FIG. 3 before the external module is accessed. FIG. 3 comprises a flow diagram (300) that describes the process of STOMPing an external module for authentication purposes. First, the external module is loaded (302) into memory. Then the STOMPing process begins by the embedded RSA public key being used to decrypt (304) the encrypted K that is part of the authentication token. That K generates (306) a stream of pseudo random bytes. Finally, these pseudo random bytes are XORed (308) with the module in memory that makes the module unusable. Once the STOMPing process has completed the external module may be validated using the UNSTOMPing procedure described below.

Figure 4:
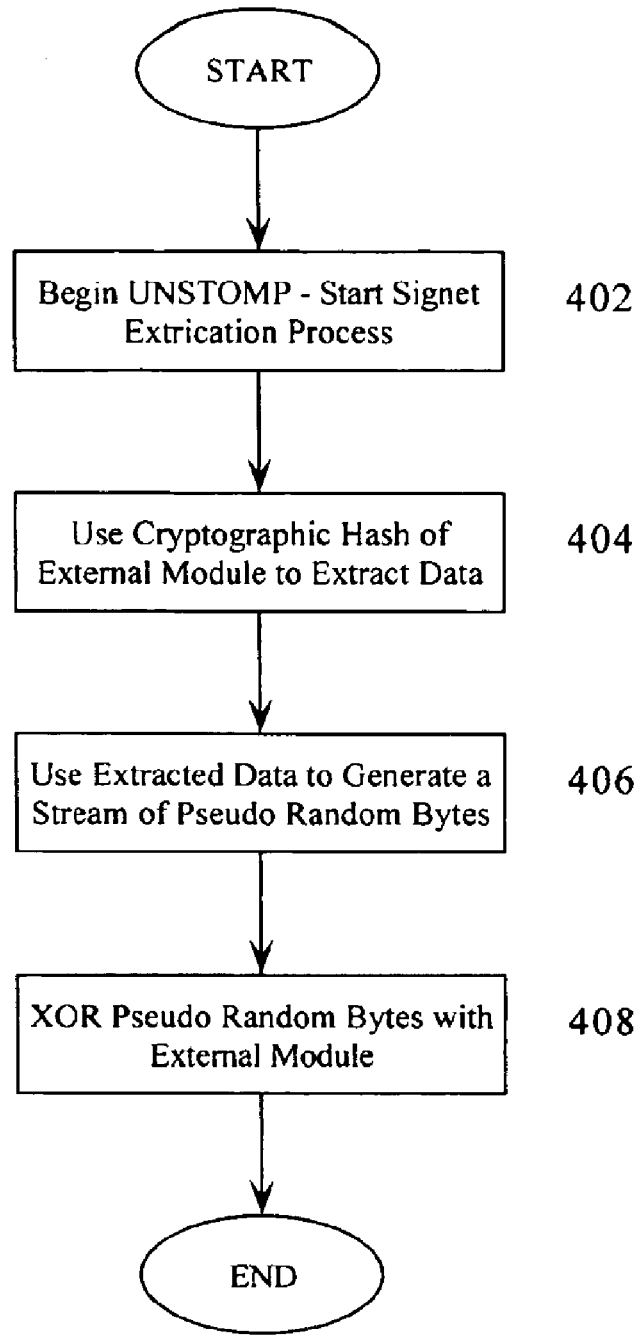
FIG. 4 is a flow diagram (400) that describes the process of UNSTOMPing an external module to ensure the authenticity of the external module.

FIG. 4 comprises a flow diagram (400) that describes the process of UNSTOMPing an external module to ensure the authenticity of the external module. First, the signet extrication process begins (402) by using the cryptographic hash of the external module to extract data (404). Here, the cryptographic hash serves the role of the "user data" as described in the original signet patents. The extrication data which, if the external module has not been tampered with should be the same K. is used to generate (406) the same stream of pseudo-random bytes as previously described. However, the method used to produce the pseudo random byte stream is different from that described previously. Thus, the process produces the same stream of random bytes in two different ways at least one set of random bytes being dependent upon the hash. Then a generation technique employed here is that these bytes are XORed with the external module mapped in memory (408), thus undoing the STOMPing in the step above.

Finally, the verification code needs access to the external module and the corresponding authentication token in order to verify the authenticity of the external software module. If the external module verification succeeds, the external module is mapped into memory and restored to its original content. However, if the verification process fails, the external module consists of random bytes which when executed undoubtedly cause an application error. No illicit patches are thereby allowed to effect the operation of a computer entity.

High Level Overview

The invention as described further comprises the following additional unique characteristics:

1. The secure hash algorithm used for the signet needs to take into account that the external module might have been relocated by the operating system's loader. One way to resolve this issue is by hashing the external module as a file on the hard drive as opposed to as an image in memory. In that case, of particular importance is the ability to get a strong association between the module mapped in memory and the source file name. The Windows family of operating systems provides a system call for obtaining that information, i.e., the GetModuleFilename(X) API.
2. All DLLs are loaded by the system loader to their preferred base address which is hardwired in the DLL module. Obviously collisions may occur if two DLLs are set up for the same base address. In that case, the loader performs a DLL relocation, meaning that one of the modules gets moved to a different base address. As part of that relocation, certain instructions in the DLL (like absolute references) are modified by the loader. This results in a different hash. The canonical hash avoids these issues by transforming these instructions temporarily into a canonical form. A canonical hash is obtained by converting all instructions which might be changed during a relocation into a canonical form (e.g. based on load address 0) before calculating the hash. This feature suitable for use by a preferred embodiment of the present invention is described in patent application entitled "Integrity Checking An Executable Module And Associated Protected Service Provider Module", application Ser. No. 09/352,285, filed on Jul. 13, 1999, by International Business Machines, Inc., and is hereby incorporated by reference herein.
3. Another aspect of the invention is that the authentication token can be embedded in the external module as long as the external module itself remains functional. This has the advantage that the authentication token is always readily available when the external module is accessed. On the Windows family of operating systems, the embedding can be realized by adding an additional data section to a DLL in Portable Executable (PE) format. This does not affect the functionality of the DLL but allows for the data to be retrieved if necessary. The disclosure of the invention covers both external and embedded authentication tokens.
4. In addition to an initial authentication, the scheme presented in the disclosure can be further enhanced by performing run time checks to make sure that function calls to the external module are not intercepted by an attacker. For example, a breakpoint instruction (Trap x03 on the Intel Pentium) might be used to intercept the function calls before control is actually transferred to code in the external DLL.
5. In addition to an initial authentication, the external module can be re-authenticated periodically by performing the verification procedure described in the disclosure multiple times while interacting with an external module.
6. The process of creating the authentication token can be automated, for example by providing the developers of the external module access to a Web site which allows them to submit the hash of their module and to retrieve the authentication token. Of course the Web site would have to implement sufficient access control mechanisms in order to be accessible only by authorized third parties.
7. The transforming function is a stream encryption cipher in the UNSTOMP function, and a XOR with pseudo-random data in the STOMP. These two functions are logically equivalent, but generate quite different code. This complicates the hackers job of analyzing the STOMP/UNSTOMP behavior.
8. In a preferred embodiment, the key value K is expanded by using it as a seed to produce pseudo-random bytes. This is because software modules are generally much larger than the length of the value K that can be efficiently calculated with RSA or signet technology, and the number of bytes that are needed for the STOMP/UNSTOMP behavior is equal to the size of the module. Of course, if the software module is small, or if the K calculation is more efficient, it is within the scope of this invention to forgo the pseudo-random bytes and use K directly.

Alternative Embodiments

An alternate embodiment envisions the use of signet data in both the STOMP and the UNSTOMP processes. Further, as a third option, the STOMP uses signets and the UNSTOMP uses another cryptographic technique like the RSA protocol to accomplish the authentication of the external module. All of these are within the scope of the invention.

Conclusion

Therefore, a more efficient method, apparatus and product for securing and verifying the authenticity of external modules has been described. Thus, the limitations defined in the prior art have been overcome. In addition, the description has included an improved system and method for controlling the enablement of an external module so that an application loading the external module fails in the event that the module is illicitly patched by a hacker. Otherwise, the actuation of the application is permitted because the STOMP-UNSTOMP procedure has validated the authenticity of the external module. Finally, the invention is implemented as part of the EMMS, or Electronic Media Management System End User Toolkit as of release 1.33. The invention is used to authenticate external decoder modules which are provided by third party companies.

DISCUSSION OF HARDWARE AND SOFTWARE IMPLEMENTATION OPTIONS

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer readable medium which may be used to hold, contain or deliver the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for authenticating an external module comprising the steps of:
    providing data K that can be created by using two different schemes, at least one scheme of the two different schemes being based on the integrity of a module to be verified;
    providing an authentication token for said module which produces data K in both schemes, an executable external module being representative of said module;
    at a computer system, using data K as created by one scheme of the two different schemes to disrupt said executable external module; and
    at the computer system, using data K as created by the other scheme of the two different schemes to restore the executable external module from the disrupted executable external module thereby authenticating said executable external module.

2. The method as defined in claim 1, wherein one or more of the schemes is based on RSA encryption.

3. The method as defined in claim 1, wherein one or more of the schemes is based on digital signets.

4. The method as defined in claim 1, further comprising the step of:
    embedding a public component of one or more of the schemes in a verification code of the executable external module.

5. The method as defined in claim 1, further comprising the step of:
    conveying private components of all schemes to a module authentication authority.

6. The method as defined in claim 5, wherein the providing an authentication token step is automated by providing developers of the module access to a Web site which allows them to submit the hash of their module and to retrieve the authentication token.

7. The method as defined in claim 1, wherein the authentication token is embedded
    in the executable external module as long as the executable external module itself remains functional.

8. The method as defined in claim 7, where the embedding is realized by adding an
    additional data section to a DLL in Portable Executable (PE) format.

9. The method as defined in claim 1, wherein the authentication token is external to the executable external module.

10. The method as defined in claim 1, wherein said at least one scheme depending on code integrity is independent of a location of the executable external module in memory.

11. The method as defined in claim 10, wherein location independence is achieved by locating and reading the executable external module's image on a disk.

12. The method as defined in claim 10, wherein location independence is achieved by using a canonical hash.

13. The method as defined in claim 1, wherein
the using data K as created by one scheme to disrupt said executable external module, and
the using data restore the executable external module from the disrupted executable external module,
are performed at run time of the executable external module at the computer system.

14. A method for secure authentication of external modules on an entity comprising the steps of:
storing an executable external module in memory at a computer system;
STOMPing, at the computer system, the executable external module by
decrypting a number of pseudo-random bytes that are part of an authentication token using a public security code of a public and private component pair security code; and
XORing the decrypted pseudo-random bytes with the executable external module thereby disrupting the executable external module into an unusable state; and
UNSTOMPing, at the computer system, the executable external module in the unusable state by
performing a signet extrication process to generate extrication data by using the hash of the executable external module in the unusable state;
using the extrication data to generate another stream of pseudo-random bytes; and
XORing the another stream of pseudo-random bytes with the executable external module in the unusable state thereby
restoring, from the executable external module in the unusable state, the executable external module back to a usable state in the event there has been no illicit patching of the executable external module, and
maintaining the executable external module in an unusable state in the event that the executable external module has been illicitly patched such that an application or program that is accessing the executable external module in the unusable state fails to operate.

15. The method as defined in claim 14, wherein the public and private components of
the security code comprise security codes selected from a group of security codes of: a signet pair and an RSA pair.

16. The method as defined in claim 14, further comprising the step of:
re-authenticating, at the computer system, the executable external module by periodically performing the STOMP and UNSTOMPing process multiple times while interacting with the executable external module at the computer system.

17. The method as defined in claim 14, further comprising the step of:
performing run time checks of the executable external module to make sure that function calls to the executable external module are not intercepted by an attacker.

18. A computer readable medium comprising instructions for secure authentication of
executable external modules at a computer system comprising the instructions of:
storing an executable external module in memory at a computer system;
STOMPing, at the computer system, the executable external module by
decrypting a number of pseudo-random bytes that are part of an authentication token using a public security code of a public and private component pair security code; and
XORing the decrypted pseudo-random bytes with the external module thereby disrupting the executable external module into an unusable state; and
UNSTOMPing, at the computer system, the executable external module in the unusable state by
performing a signet extrication process to generate extrication data by using the hash of the executable external module in the unusable state;
using the extrication data to generate another stream of pseudo-random bytes; and
XORing the another stream of pseudo-random bytes with the executable external module in the unusable state thereby
restoring, from the executable external module in the unusable state, the executable external module back to a usable state in the event there has been no illicit patching of the executable external module, and
maintaining the executable external module in an unusable state in the event that the executable external module has been illicitly patched such that an application or program that is accessing the executable external module in the unusable state fails to operate.

19. The computer readable medium as defined in claim 18 wherein the public and
private components of the security code comprise security codes selected from a group of security codes of: a signet pair and an RSA pair.

20. A computer system for secure authentication of executable external modules, comprising:
a loader unit for loading an executable external module into memory;
a decryption unit for decrypting a number of pseudo-random bytes that are part of an authentication token using a public security code of a public and private component pair security code; and
a processor, communicatively coupled with the memory and the decryption unit, for
XORing the decrypted pseudo-random bytes with the executable external module thereby disrupting the executable external module into an unusable state;
performing a signet extrication process to generate extrication data by using the hash of the executable external module in the unusable state;
using the extrication data to generate another stream of pseudo-random bytes; and
XORing the another stream of pseudo-random bytes with the executable external module in the unusable state thereby
restoring, from the executable external module in the unusable state, the executable external module back to a usable state in the event there has been no illicit patching of the executable external module, and
maintaining the executable external module in an unusable state in the event that the executable external module has been illicitly patched such that an application or program that is accessing the executable external module in the unusable state fails to operate.

* * * * *